Nov. 12, 1946.   M. A. CROSBY   2,411,027
DUAL INTERSECTING WIRE TUBE BELT
Filed March 8, 1943
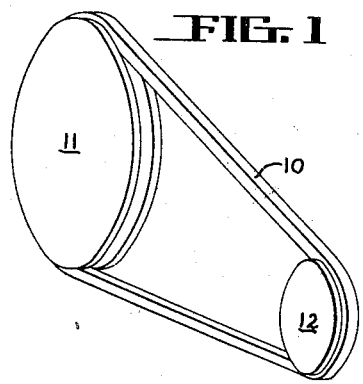
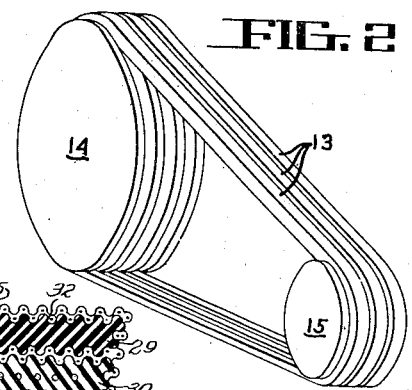
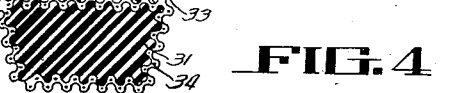
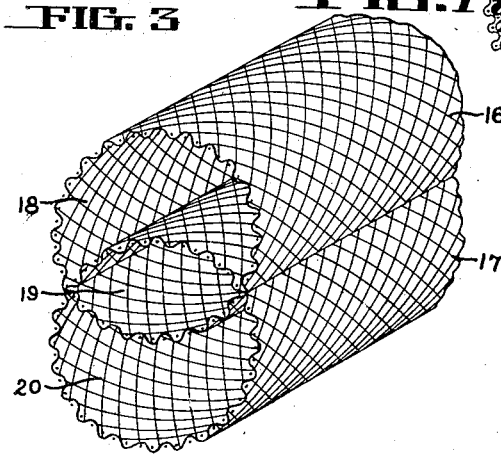
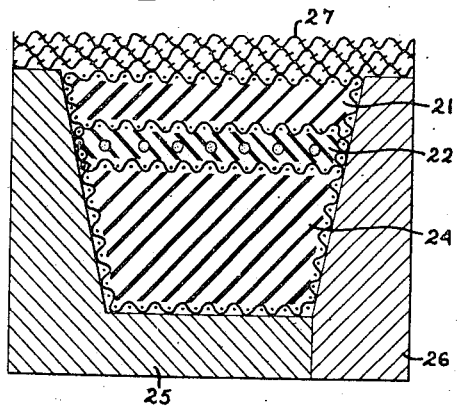
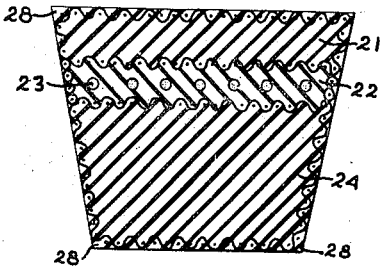
INVENTOR
MELVIN A. CROSBY
BY
Toulmin & Toulmin
ATTORNEY Patented Nov. 12, 1946

2,411,027

UNITED STATES PATENT OFFICE 2,411,027

DUAL INTERSECTING WIRE TUBE BELT

Melvin A. Crosby, Dayton, Ohio, assignor to The Dayton Rubber Manufacturing Company, Dayton, Ohio, a corporation of Ohio Application March 8, 1943, Serial No. 478,433

11 Claims. (Cl. 74—233)

This invention refers to belts, and more particularly deals with a V-type belt in which the tension, neutral axis and compression sections are surrounded by and reinforced with woven metal cloth.

The belt of the present invention is characterized by long service life, resistance to frictional abrasion, high flexibility, and substantial inextensibility. It may be manufactured in the usual V-belt style with smooth top and bottom surfaces or it may be provided with grooves transverse of the longitudinal axis of the belt on either the top or the bottom surfaces or on both for the purpose of increasing the flexibility or to reduce internal stresses when the belt passes over pulleys of small diameter, thereby insuring a cooler running belt and a greater service life.

The nature of the present invention will be better understood from the following description taken in connection with the annexed drawing, in which:

Fig. 1 is a diagrammatic illustration of a single belt V-drive;

Fig. 2 is a diagrammatic illustration of a multiple belt V-drive;

Fig. 3 is a perspective view of the dual metal cloth tubes employed in the manufacture of the belt of this invention;

Fig. 4 is a cross sectional view of a roughly formed belt body prior to vulcanization made according to the present invention;

Fig. 5 is a cross sectional view illustrating one manner of molding the belt of the present invention;

Fig. 6 is a cross sectional view of the finished belt of the present invention; and Fig. 7 is a cross sectional view of another belt of the invention.

Referring to the drawing in detail, in Fig. 1, 10 represents the belt of the present invention passing over the pulleys or sheaves 11 and 12 as in a single belt drive, while in Fig. 2, 13 represents a plurality of belts of the present invention passing over the pulleys or sheaves 14 and 15 as in a multiple belt drive.

Fig. 3 illustrates integrally woven wire cloth tubes or sleeves 16 and 17 providing compartments 18, 19 and 20. The compartments 18, 19 and 20 are adapted to comprise the tension, neutral axis and compression sections of a belt, respectively. In the practice of the present invention a layer of rubber composition is inserted by extrusion or otherwise in the compartment 18, a similar layer including a plurality of parallelly laid cords is inserted in the compartment 19 by similar means, and a third layer of rubber composition is inserted by similar means in the compartment 20.

The structure of Fig. 3, after the several layers have been inserted in compartments 18, 19 and 20 is subjected to a forming operation to give it the general configuration of a V-belt and in the course of this operation the compartments 18, 19 and 20 are deformed and molded to the general shape illustrated in Fig. 4. The layer of rubber composition which was inserted in the compartment 18 becomes the tension layer 21, the layer of rubber composition which was inserted in the compartment 19 becomes the neutral axis section 22 reinforced with the parallelly laid cords 23, and the layer of rubber composition inserted in the compartment 20 becomes the compression section 24 of the belt. The deformation of the dual tubes 16 and 17 provides the structure illustrated in Fig. 4 wherein the tension, neutral axis and compression sections of the belt are each surrounded by and reinforced with the woven wire cloth which originally formed the dual tubes 16 and 17.

This roughly formed V-belt of Fig. 4 is then placed in a mold as shown in Fig. 5. The mold consists of a fixed section 25 and a removable section 26. The belt of Fig. 4 is placed in position between the mold sections 25 and 26 and a wet wrapper 27 of fabric is wound around the periphery of the mold. The mold is then placed in a vulcanizer wherein the evaporation of moisture from the wet wrapper 27 causes shrinkage of said wrapper 27 and the exertion of pressure on the belt body within the mold. At the end of the vulcanizing period, the belt body is removed from the mold and the resulting product is substantially as shown in Fig. 6.

It will be noted from Fig. 6 that during the vulcanizing operation, due to the influence of heat and pressure, part of a rubber composition forming the tension, neutral axis and compression sections 21, 22 and 24, respectively, is squeezed or pushed out through the woven wire cloth surrounding the belt body so that, in effect, the finished belt includes a thin outer coating or covering of rubber 28. Therefore, when passing over a sheave or pulley the frictional engagement is between the pulley faces and the thin rubber coating on the side walls of the belt. After this thin rubber coating wears down, the woven metal cloth is exposed and comes into contact with the pulley faces, but sufficient rubber remains in the apertures between the individual strands of wire of the metal cloth to provide frictional engagement between the rubber of the belt and the metal of the pulley.

It will be understood that it is advantageous that the woven wire dual tubes have the wires running at a bias in order that maximum stretch or flexibility may be imparted to the belt as it passes over sheaves or pulleys of small diameter.

It will be understood also that instead of using integrally woven dual tubes, the individual sections of the belt (see Figure 7, tension section 29, neutral axis section 30 and compression sections 31) may be wrapped in individual metal cloth wrappers 32, 33, 34, respectively, and superposed one upon the other in proper relationship and the whole then wrapped with a further layer of metal cloth 35. The resulting structure would be substantially the same in effect as the structure which has been illustrated in the annexed drawing and described hereinbefore, but it would be stronger and in some instances more satisfactory from the point of view of manufacturing.

In describing and illustrating in the drawing the mold employed in carrying out the present invention, a mold adapted to produce a plain V-belt has been described and illustrated, but those skilled in the art will understand that a mold adapted to produce cogs and grooves on the underside or on the outer side or on both sides of the belt could be substituted for the production of cogged or grooved belts.

The cords 23 forming part of the neutral axis section 22 may comprise thin metal wires or cables or cords made of organic fibrous material such as cotton or rayon or of inorganic fibrous material such as fine glass fiber. Obviously, more than one layer of cords may be employed if necessary, the choice depending on the type of belt being manufactured and the service in which it is to be employed.

While there have been described herein and illustrated in the drawing certain particular embodiments of this invention, it is not intended that this invention be limited to or circumscribed by the specific details of construction, arrangement of parts, procedures, or products herein described or illustrated in the drawing in view of the fact that this invention is susceptible to modifications depending on individual preference and conditions without departing from the spirit of this disclosure and the scope of the appended claims.

I claim:

1. As a new article of manufacture, a belt comprising tension, neutral axis and compression sections of rubber composition having a woven wire cloth wrapper therearound and woven wire cloth completely surrounding the neutral axis section, said neutral axis section including a plurality of parallelly laid cords lying along the longitudinal axis of the belt.

2. As a new article of manufacture, a belt comprising dual tubes of metal wire woven integrally to produce compartments adapted to receive layers of rubber composition comprising tension, neutral axis and compression sections, the whole being vulcanized and consisting of an integral unitary article.

3. As a new article of manufacture, a belt comprising a tension section of rubber composition, a neutral axis section of rubber composition reinforced with cords laid parallel to each other and along the longitudinal axis of the belt, and a compression section of rubber composition, said tension, neutral axis and compression sections being separated from each other by layers of woven metal cloth.

4. As a new article of manufacture, a belt comprising a tension section of rubber composition, a neutral axis section of rubber composition reinforced with cords laid parallel to each other and along the longitudinal axis of the belt, and a compression section of rubber composition, said tension, neutral axis and compression sections being separated from each other by layers of woven metal cloth, and said sections having an outer wrapper of woven metal cloth.

5. As a new article of manufacture, a belt comprising a tension section of rubber composition, a neutral axis section of rubber composition reinforced with cords laid parallel to each other and along the longitudinal axis of the belt, and a compression section of rubber composition, said tension, neutral axis and compression sections being separated from each other by layers of woven metal cloth, said belt having an outer wrapper of woven metal cloth and a thin outer coating of rubber composition.

6. As a new article of manufacture, a rubber belt of substantial thickness consisting of tension, neutral axis and compression sections, said sections consisting mainly of rubber material of substantial thickness and each of said sections being completely surrounded and separated by woven metal cloth.

7. As a new article of manufacture, a rubber belt of substantial thickness having a wrapper of woven metal cloth therearound, said rubber belt consisting of tension, neutral axis and compression sections, said sections consisting mainly of rubber material of substantial thickness and being separated by woven metal cloth.

8. As a new article of manufacture, a rubber belt of substantial thickness consisting of tension, neutral axis and compression sections, said sections consisting mainly of rubber material of substantial thickness and having a wrapper of woven metal cloth therearound and around said neutral axis section whereby said neutral axis section is separated from said tension and said compression sections.

9. As a new article of manufacture, a rubber belt of substantial thickness consisting of tension, neutral axis and compression sections, said sections consisting mainly of rubber material of substantial thickness and each of said sections being completely surrounded and separated by woven metal cloth, said belt being vulcanized as a unitary article and having a thin coating of rubber material covering its surface.

10. As a new article of manufacture, a rubber belt of substantial thickness consisting of tension, neutral axis and compression sections of rubber material of substantial thickness and of a wire fabric completely surrounding said belt and extending between said sections.

11. As a new article of manufacture, a rubber belt of substantial thickness consisting of tension, neutral axis and compression sections of rubber material of substantial thickness and of a wire fabric completely surrounding said belt and extending between said sections, said sections being vulcanized together so as to form an integral unit.

MELVIN A. CROSBY.